United States Patent [19]
Cocron

[11] 4,344,024
[45] Aug. 10, 1982

[54] DIGITAL CONTROL SYSTEM FOR AUTOMATIC-FOCUS CAMERAS

[75] Inventor: István Cocron, Munich, Fed. Rep. of Germany

[73] Assignee: AGFA-Gevaert AG, Leverkusen, Fed. Rep. of Germany

[21] Appl. No.: 272,557

[22] Filed: Jun. 11, 1981

Related U.S. Application Data

[62] Division of Ser. No. 166,093, Jul. 3, 1980, Pat. No. 4,314,187.

[30] Foreign Application Priority Data

Dec. 7, 1979 [DE] Fed. Rep. of Germany ....... 2928142

[51] Int. Cl.³ ............................................... G05B 1/06
[52] U.S. Cl. .................................. 318/640; 318/480; 354/25; 250/201
[58] Field of Search ....................... 318/640, 626, 480; 354/25; 328/127; 250/201

[56] References Cited

U.S. PATENT DOCUMENTS

| | | | |
|---|---|---|---|
| 3,935,524 | 1/1976 | Cap et al. | 318/640 |
| 4,072,962 | 2/1978 | Maida | 318/640 X |
| 4,239,354 | 12/1980 | Shenk | 318/611 X |
| 4,291,223 | 9/1981 | Sakane et al. | 354/25 |

*Primary Examiner*—B. Dobeck
*Attorney, Agent, or Firm*—Michael J. Striker

[57] ABSTRACT

A digital control circuit for use in automatic-focus cameras is disclosed, which is suitable for use in self-focusing systems which determine focus by means of triangulation. The system corrects for motor oscillation about a state of proper focus, defocusing caused by inertia, and for an inability to evaluate proper state of focus caused by large distances between the camera and a subject.

7 Claims, 5 Drawing Figures

DIGITAL CONTROL SYSTEM FOR AUTOMATIC-FOCUS CAMERAS

This is a division of application Ser. No. 166,093, filed July 3, 1980, now U.S. Pat. No. 4,314,187.

BACKGROUND OF THE INVENTION

This invention pertains to a control system which can be used to drive a servo such as an electric motor in self-focusing cameras and the like. More particularly, this invention pertains to a control system of this type which can be used in automatic-focusing systems which use an infra-red transmitter and two infra-red receivers (all fixed on the camera) to determine proper distance to a subject using triangulation.

Inasmuch as electric motors and mechanical elements driven thereby have mechanical inertia, it is possible that a motor which adjusts the focus of a camera objective may, by virtue of inertia, overshoot the position to which the objective is to be adjusted. In the event that such overshoot takes place, it is necessary to reverse the motor and attempt once again to properly adjust the camera objective. However, as focusing criteria are set to increasingly precise values, the likelihood of motor oscillation about the point of critical focus increases. Such oscillation is clearly undesirable since it is desirable to focus a camera objective as quickly as possible so as to avoid user inconvenience.

Moreover, in systems which utilize transmitters and receivers such as those disclosed above, it is possible that when distant subjects are to be photographed, the energy received at the camera site will be insufficient to enable electronic circuitry which is used to drive the motor to detect non-congruence between the outputs of the two receivers which are utilized. This is also clearly undesirable, since without some definite determination of congruence and non-congruence between signals at the receivers, the motor cannot be driven and focusing cannot therefore take place.

It would therefore be desirable to provide a control system of this type which would prevent continuous oscillation of such a servo, and which would further allow the motor to be driven even in the absence of sufficiently strong signals received by the receivers.

SUMMARY OF THE INVENTION

These objects, among others which will become apparent hereinafter, are achieved by the use of two separate groups of circuits which are contained within the control system. One such group of circuits includes a transition monitor, a counter, and a driver override circuit.

The transition monitor monitors certain signals which are characteristic of the radiation received by the receivers. As is known to those skilled in the art, congruence between these two signals indicates proper focusing, while non-congruence between these two signals indicates improper focusing. Inasmuch as a camera objective can be focused either before or after a subject which is to be photographed, non-congruence can be either positive or negative. The transition monitor generates a transition signal whenever the signals being monitored change from non-congruent signals to congruent signals, and when such signals change from non-congruent signals to other non-congruent signals of opposite sense. Hence, the transition monitor will generate a transition signal each time a region of proper focus is either reached or overshot.

The counter provided in the control circuit counts the number of transition signals which are so generated, and after a predetermined number of such transition signals has been generated, the drive override circuit is activated causing the motor to be shut off for a predetermined period of time. In this fashion, motor oscillation about a point of proper focus is avoided.

The second group of circuits includes a transition signal generator. This circuit monitors the same signals as does the transition monitor, but the transition signal generator checks for a condition in which both signals are checked for low-level congruence. Such low-level congruence may result not only from a proper focusing of the camera, but also from the aiming of the camera (whether or not properly focused) at a subject which is so remote from the camera as to prevent the two receivers from receiving enough radiation so as to enable the rest of the circuitry to determine whether or not congruence or non-congruence exists. In the event that low-level congruence between the two signals exists for longer than some predetermined time, a transition signal is artificially generated for subsequent counting in the counter, and the motor is shut off by the drive override circuit. In this fashion, the control circuits still operate, even when the receivers do not receive reflected radiation which is sufficiently strong so as to enable congruence or non-congruence to be determined.

The novel teachings which are considered as characteristic for the invention are set forth in particular in the appended claims. The invention itself, however, both as to its construction and its method of operation, together with additional objects and advantages therefor, will be best understood from the following description of specific embodiments when read in connection with the accompanying drawings.

DETAILED DESCRIPTION OF PREFERRED EMBODIMENTS

Figure 1:
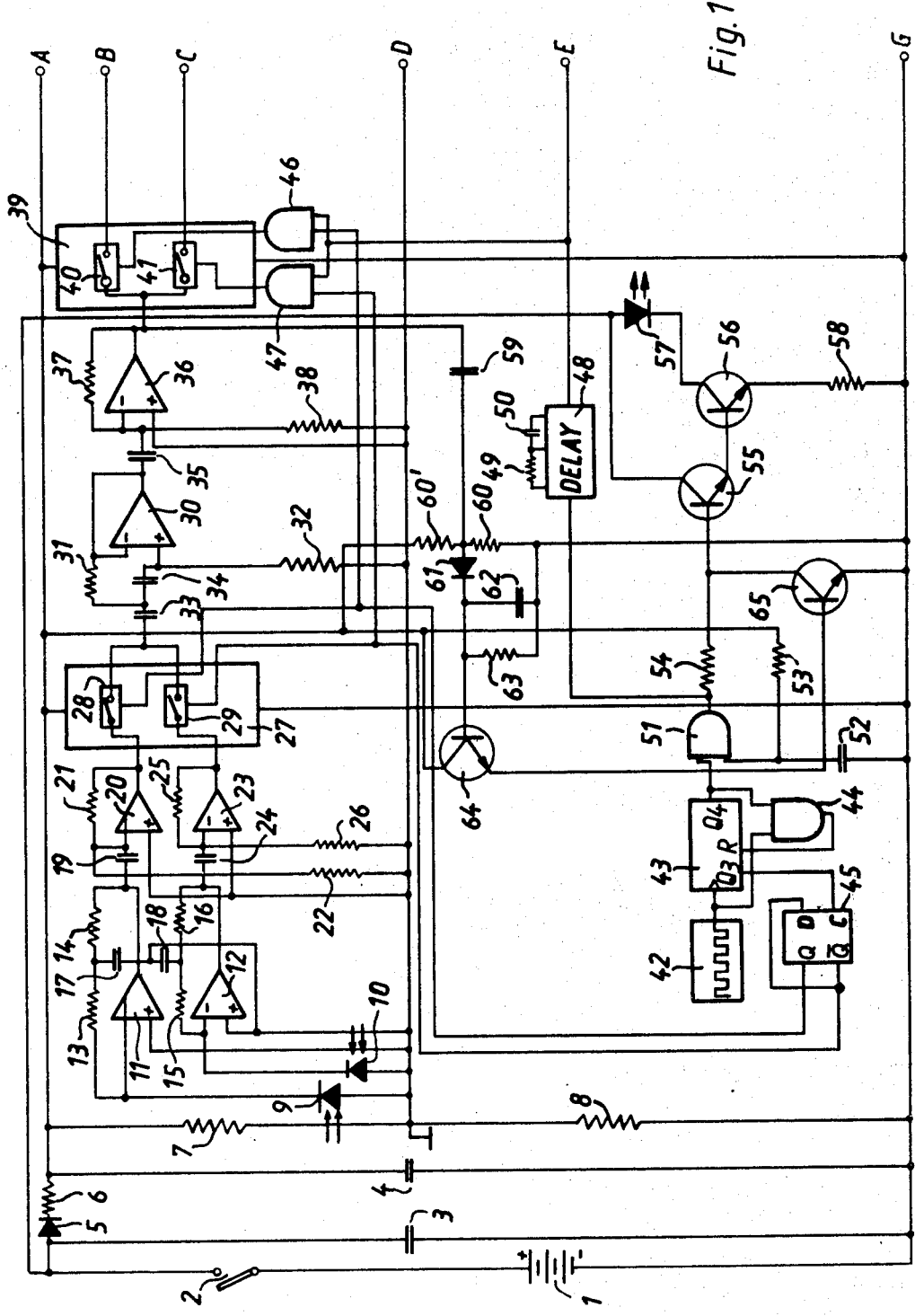
FIGS. 1 and 2 show a schematic diagram of the control system described herein.

Referring first to FIG. 1, it can be seen that a battery 1 has its positive terminal connected to a single-pole single-throw switch 2 which serves as an on-off switch. A capacitor 3 is placed across both the battery 1 and switch 2, in order to serve as a voltage stabilizer. The anode of diode 5 is connected to one plate of capacitor 3 and one end of switch 2, and the cathode of diode 5 is connected to resistor 6. The end of resistor 6 which is remote from diode 5 is connected to one plate of capacitor 4, and the other plate of capacitor 4 is connected to the negative terminal of battery 1 and a plate of capacitor 3. It will be apparent to one skilled in the art that capacitors 3,4 and diode 5 all serve the purpose of stabilizing the voltage of battery 1 for subsequent use. Two like resistors 7,8 are placed in series with each other across capacitor 4 to form a voltage divider, with the centerpoint of the divider being grounded in order to provide two symmetrical voltage sources which can be used to drive the rest of the circuitry disclosed herein.

Operational amplifiers 11,12,20,23 are all connected to the voltage supply which is defined by resistor 7 by power connections which have been omitted from FIG. 1. The inverting input of operational amplifier 11 is connected to the cathode of infra-red photodiode 9. The anode of photodiode 9 is grounded. Likewise, the cathode of infra-red photodiode 10 is connected to the inverting input of operational amplifier 12, while the anode of photodiode 10 is grounded. The output of operational amplifier 11 is fed back to the inverting input through a series network including resistors 13,14 while the output of operational amplifier 12 is likewise fed back to the inverting input by means of a series network including resistors 15,16. Preferably, resistors 13,15 have like values, as do resistors 14,16.

Like capacitors 17,18 are connected in series with each other. Capacitor 17 is connected at one end to the common junction point of resistors 13,14, while capacitor 18 is connected at one end to the common junction point between resistors 15,16. Moreover, the common junction point of capacitors 17,18 is connected to ground. The non-inverting inputs of operational amplifiers 11,12 are both grounded.

Those skilled in the art will readily see that operational amplifiers 11,12 are thus connected as amplifiers which have gains that increase with frequency of input signals applied to their inverting inputs, since the impedance of capacitors 17,18 decreases with increasing frequency. Therefore, whatever AC voltages are developed across photodiodes 9,10 will be amplified, respectively, by operational amplifiers 11,12.

The output of operational amplifier 11 is connected to the inverting input of operational amplifier 20 through coupling capacitor 19. Likewise, the output of operational amplifier 12 is connected to the inverting input of operational amplifier 23 by coupling capacitor 24. The non-inverting inputs of operational amplifiers 20,23 are grounded. In both cases, the outputs of operational amplifiers 20,23 are fed back to their inverting inputs—in the case of operational amplifier 20, feedback takes place through resistor 21, while in the case of operational amplifier 23, feedback takes place through resistor 25, which has the same value as resistor 21. Resistor 22 connects the inverting input of operational amplifier 20 to ground, while resistor 26 connects the inverting input of operational amplifier 23 to ground. Resistors 22,26 are of like values. It may thus be seen that operational amplifiers 20,23 serve as AC amplifiers for the outputs of operational amplifiers 11,12 respectively, and amplify AC signals developed across photodiodes 9,10 respectively. In this connection, it will be noted that resistors 21,22 cooperate to hold the gain of operational amplifier 20 at a constant value, while resistors 25,26 perform the same function regarding operational amplifier 23.

The outputs of operational amplifiers 20,23 are routed to a multiplexer 27 to be multiplexed for subsequent signal processing. Multiplexer 27 contains two switching elements 28,29, which are so coordinated that either one or the other of them is closed. When switching element 28 is closed, the output from operational amplifier 20 is processed, while when switching element 29 is closed, the output from operational amplifier 23 is processed.

Such processing begins with a high-pass active filter which includes elements 30–34. The output of multiplexer 27 is routed to the non-inverting input of operational amplifier 30 through capacitors 33,34, which are connected in series with each other. The non-inverting input of operational amplifier 30 is held off ground by resistor 32, while the common junction point of capacitors 33,34 is connected to the inverting input of operational amplifier 30 via resistor 31. Finally, the output of operational amplifier 30 is connected to the inverting input of the operational amplifier.

The high-pass filter just described serves as an interference suppression network. As will be seen hereinafter, photodiodes 9,10 are exposed to ambient light conditions, which ambient light conditions may include fluorescent lights and other light sources driven off local power lines. The purpose of the high-pass filter is to suppress interference voltages which have frequencies equal to the first or second harmonic of line voltage, in order to make sure that interference of this type is eliminated as much as possible from the rest of the circuitry described herein.

The output of operational amplifier 30 is routed to the inverting input of operational amplifier 36 through capacitor 35. The non-inverting input of operational amplifier 36 is grounded, while the output of operational amplifier 36 is fed back to the inverting input by means of resistor 37. Moreover, resistor 38 biases the inverting input of operational amplifier 36 off ground.

Those skilled in the art will readily understand that operational amplifier 36 is thus connected as an AC amplifier for amplifying the output from the high-pass filter. This not only serves the purpose of amplifying the output from the high-pass filter, but additionally serves the purpose of keeping the DC component of the outputs of photodiodes 9,10 within bounds so as to prevent ambient infra-red sources from interfering with the distance measurements which will be hereinafter seen to take place.

The output of operational amplifier 36 is routed to a demultiplexer 39. Demultiplexer 39 contains switching elements 40,41, which are in all ways analogous to switching elements 28,29 in multiplexer 27. Moreover, as will be seen hereinafter, switching elements 28,40 open and close together, as do switching elements 29,41. Thus, when switching elements 28,40 are closed, the amplified AC component of the output of photodiode 9 will be present at point B in FIG. 1. Likewise, the amplified AC component of photodiode 10 will be routed to point C in FIG. 1 when switching elements 29,41 are closed.

As will be seen hereinafter, it is important that the processing to which the outputs of photodiodes 9,10 are subjected is exactly the same, whether photodiode 9 or photodiode 10 is actually connected. By utilizing multiplexer 27 and demultiplexer 39, the filtering and DC component removal is accomplished by utilizing the same components, assuring uniformity in signal processing. Moreover, this structure results in a reduction in the number of components which are utilized in the system.

A square-wave pulse generator 42 is connected across resistor 8 by power connections, which are not shown. The output of pulse generator 42 is routed to the clock input of a counter 43, which is likewise powered by unshown power connections across resistor 8. Output Q3 of counter 43 is connected to the clock input of flip-flop 45. Finally, the Q output of flip-flop 45 is connected to its D input.

Flip-flop 45 is a D-type flip-flop. Whenever a pulse appears at the clock input of flip-flop 45, the logical state of the D input is reflected at the Q output. Moreover, the Q output and the $\overline{Q}$ output are always inverse to each other—when either output is logically high, the other output is logically low and vice versa.

Assuming for the moment that flip-flop 45 is in its reset state, i.e., is in a state in which the Q output is logically low and the $\overline{Q}$ output is logically high, it can be seen that when a clock pulse is received at clock input C that the states of outputs Q and $\overline{Q}$ will be interchanged—output Q will be brought logically high, while output $\overline{Q}$ will be brought logically low. Upon receipt of a subsequent clock pulse at clock input C, output $\overline{Q}$ will once again be brought logically high, while output Q will be brought logically low. Thus, as clock pulses are routed to clock input C of flip-flop 45, the logical states of outputs Q and $\overline{Q}$ will be successively interchanged.

Output Q of flip-flop 45 is connected to switching element 28 in multiplexer 27. Likewise, output $\overline{Q}$ of flip-flop 45 is connected to switching element 29 in multiplexer 27. Thus, as was mentioned above, as pulses from pulse generator 42 pass through counter 43 and are routed to clock input C of flip-flop 45, switching elements 28,29 will be alternatively opened and closed in order to allow multiplexing to take place.

Resistor 53, which is placed in series with capacitor 52 across battery 1 when switch 2 is closed, keeps capacitor 52 charged and thus brings one input of AND-gate 51 logically high. As will be seen hereinafter, AND-gate 51 is used to drive infra-red light-emitting diode 57. By connecting this input of AND-gate 51 in this fashion, the output at AND-gate 51 will remain logically low after closing of switch 2 until such time as pulse generator 42 has had a chance to stabilize at the proper frequency. After such time, that input of AND-gate 51 which is connected to resistor 53 and capacitor 52 will be brought logically high and kept there for the duration of all subsequent operation.

The other input of AND-gate 51 is driven by output Q4 of counter 43. Thus, the output of AND-gate 51 will be brought logically high after switch on each time a pulse appears at output Q4 of counter 43. This output of AND-gate 51 is routed to the input of delay 48, in which resistor 49 and capacitor 50 are shown to constitute an RC time delay. The output of delay 48 is then routed to one input of each of AND-gates 46,47. The unconnected output of AND-gate 46 is connected to output $\overline{Q}$ of flip-flop 45, while the unconnected input of AND-gate 47 is connected to output Q of flip-flop 45. Finally, the output of AND-gate 46 drives switching element 40 in demultiplexer 39, while the output of AND-gate 47 drives switching element 41 in demultiplexer 39.

The time constant of delay 48 causes switching elements 40,41 in demultiplexer 39 to lag slightly behind their corresponding switching elements 28,29 in multiplexer 27. Moreover, it will be seen that switching elements 28,29 in multiplexer 27 are kept closed and open longer than their corresponding elements in demultiplexer 39. This eliminates the transmission of switching transients through the high-pass filter and the AC amplifier which process signals intermediate multiplexer 27 and demultiplexer 39. Finally, the output of pulse generator 42 is routed to an input of AND-gate 44, and output Q4 is connected to another input of AND-gate 44. The output of AND-gate 44 is routed to the reset input R of counter 43. This enables counter 43 to be reset after operation of demultiplexer 39.

Infra-red light-emitting diode 57 is forward biased with its anode being connected to the hot side of battery 1 when switch 2 is closed. The cathode of light-emitting diode 57 is connected to the collector of transistor 56. The emitter of transistor 56 is connected to the cold side of battery 1 through resistor 58. Moreover, the base of transistor 56 is connected directly to the emitter of transistor 55, while the collector of transistor 55 is connected to the anode of light-emitting diode 57. It can thus be seen that a current amplifier is formed by transistors 55,56, and that when pulses appear at the base of transistor 55, light-emitting diode 57 will be pulsed and will emit light in the infra-red portion of the spectrum. Such pulses are made to appear at the base of transistor 55 because the output of AND-gate 51 is connected thereto by resistor 54. At this point, it can be seen that light-emitting diode 57 is pulsed briefly each time a pulse appears at output Q4 of counter 43.

The output of operational amplifier 36 is routed to a voltage divider composed of like resistors 60,60' by means of a coupling capacitor 59. The common junction point of resistors 60, 60' is connected to the anode of diode 61. The cathode of diode 61 is connected to one plate of capacitor 62, and the other plate of capacitor 62 is connected to the common junction point between resistor 60 and the cold side of battery 1. Resistor 63 is placed in parallel with capacitor 62, and the base of transistor 64 is connected to the common junction point between the cathode of diode 61, a plate of capacitor 62, and one end of resistor 63. The collector of transistor 64 is connected to the hot side of resistor 7, while the emitter of transistor 64 is connected to the base of transistor 65. Finally, the collector of transistor 65 is connected to the base of transistor 55, while the emitter of transistor 65 is connected to the cold side of battery 1.

Transistors 64,65, and the components associated with diode 61, form a control circuit which regulates the amount of current passing through light-emitting diode 57 when pulses appear at the output of AND-gate 51. Capacitor 62 serves as a storage capacitor which is charged through rectifier 61 in accordance with the output of operational amplifier 36. In turn, the charge across the plates of capacitor 62 governs the current flowing through the base-emitter circuit of transistor 64, which correspondingly varies the current flowing through the base-emitter circuit of transistor 65. As the output of operational amplifier 36 increases, more current is thus caused to flow in the base-emitter circuit of transistor 65, causing more current to be drawn through the collector of transistor 65 and thus diverted from passage through transistors 55,56. Hence, as operational amplifier 36 produces a higher output, less current can be drawn through light-emitting diode 57. Conversely, as output of operational amplifier 36 decreases, less current flows through transistors 64,65 and more current is available in order to drive light-emitting diode 57.

Light-emitting diode 57 can be mounted on a camera in order to transmit pulses of radiation towards a subject. In the event that the camera is properly focused, such pulses will arrive simultaneously at photodiodes 9,10, and will produce outputs at photodiodes 9,10 simultaneously. However, in the event that the camera is improperly focused, one of photodiodes 9, 10 will be illuminated first, causing it to develop an output prior to the other one. Thus, by measuring the simultaneity with which photodiodes 9, 10 develop outputs, the state of focus of the camera can be ascertained. As the device operates, the output of light-emitting diode 57 will be held constant, and a first received signal characterizing the output of photodiode 9 will appear at point B in FIG. 1 while a second received signal characterizing the output of photodiode 10 will appear at point C. Pulses generated by pulse generator 42 will appear, after a delay in delay 48, at point E. Points A, B, and G, will be, respectively, the hot power supply voltage, the ground, and the cold power supply voltage.

Figure 2:
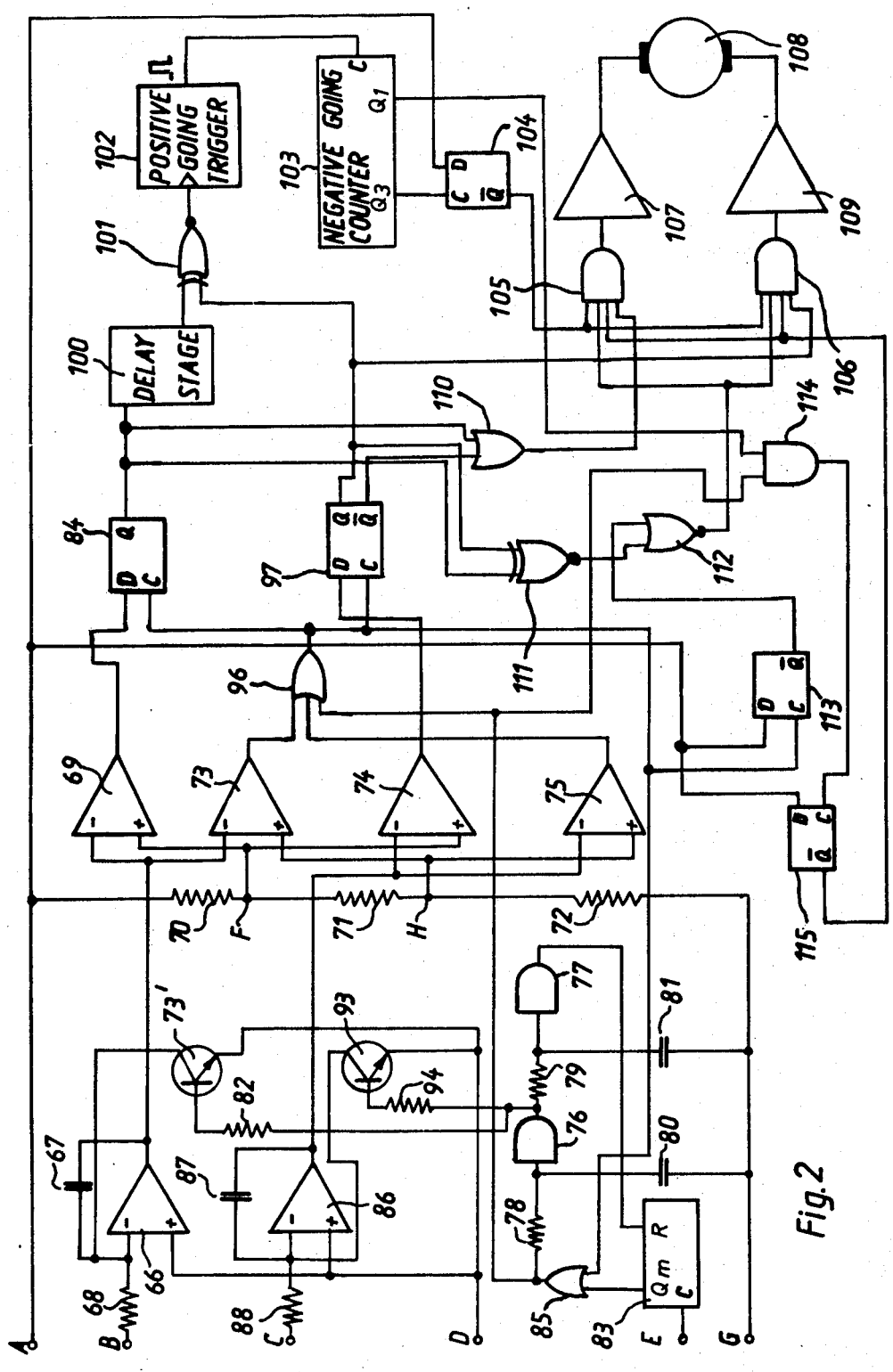

These points are also shown in FIG. 2. It will be understood that point A in FIG. 1 is connected to point A as shown in FIG. 2, and so forth. Therefore, FIGS. 1 and 2 form a unitary schematic diagram of the invention disclosed herein.

Operational amplifiers 66,86 are powered across resistor 7 by appropriate connections which have been omitted from FIG. 2. Operational amplifier 66 is connected into the configuration of an integrator, since capacitor 67 bridges across its output and its non-inverting input. The non-inverting input of operational amplifier 66 is grounded, and it can therefore be seen that the first received signal which exists at point B will be integrated in a first integrator formed by operational amplifier 66 and capacitor 67, since this signal is introduced to the inverting input of operational amplifier 66 via resistor 68.

In exactly the same fashion, a second received signal existing at point C is routed to the inverting input of operational amplifier 86 via resistor 88, and operational amplifier 86 is also connected into a second integrator by capacitor 87, which bridges across the inverting input and the output. Therefore, the output at operational amplifier 67 is a time-integrated transformation of the first received signal, while the output of operational amplifier 86 is a time-integrated transformation of the second received signal. In order to ensure accuracy, resistors 68 and 88 are of like values, capacitor 67 and 87 are of like values, and operational amplifiers 66 and 86 are identical.

The first analog signal produced at the output of operational amplifier 66 is routed to the inverting inputs of operational amplifiers 69,73. In exactly the same fashion, the second analog signal produced at the output of operational amplifier 86 is routed to the inverting inputs of operational amplifiers 74,75. The non-inverting inputs of operational amplifiers 69,74 are both connected to a reference voltage at point F, which is the uppermost tap on a voltage divider which includes resistors 70,71,72, and is placed across the hot and cold sides of battery 1. In a corresponding fashion, the non-inverting inputs of operational amplifiers 73,75 are connected together at the lower tap of the voltage divider at point H.

It will be evident to those skilled in the art that as pulses received at points B and C are integrated, respectively, in the first and second integrators formed by operational amplifiers 66,86, that the first and second analog signals produced at the outputs of these operational amplifiers will steadily decrease. As this decrease takes place, the voltages appearing at the outputs of operational amplifiers 69,73,74,75 will also increase. Inasmuch as operational amplifiers 69,74 are identical (as are operational amplifiers 73,75), and inasmuch as point F is higher on the voltage divider than point H, the outputs of operational amplifiers 69,74 will rise above zero prior to the time that the outputs of operational amplifiers 73,75 do so.

Therefore, in the event that a camera is properly focused, the outputs at operational amplifiers 69,74 will rise above zero approximately simultaneously, while the outputs of operational amplifiers 73,75 will also go above zero simultaneously, but will do so at a slightly later time. In the event that the camera is improperly focused, one of the outputs of operational amplifiers 69,74 will be above zero while the other will be below zero, and the same relationship will hold true for the outputs of operational amplifiers 73,75.

The signals at the outputs of operational amplifiers 69,74 are used to drive subsequent circuitry, and this circuitry is all digital in nature. Therefore, since the magnitude of the outputs of operational amplifiers 69,74 is subsequently irrelevant, the signals existing there can be denoted first and second digital input signals, respectively.

A ring counter 83 is connected to the output of time delay 48 at clock input C. Output Qm of ring counter 83 is connected to one input of OR-gate 85. The output of OR-gate 85 is connected both to an input of OR-gate 96 and to resistor 78. The end of resistor 78 which is remote from the output of OR-gate 85 is connected to the cold side of battery 1 via capacitor 80, and is also connected to the input of gate 76. Thus, it can be seen that resistor 78, gate 76, and capacitor 80 form a first stage in a time delay, since only after capacitor 80 charges sufficiently through resistor 78 will the input of gate 76 be brought logically high so as to bring its output logically high. The output of gate 76 is connected to three resistors: resistor 79, resistor 82, and resistor 94. Neglecting the latter two resistors for the moment, it can be seen that the end of resistor 79 which is remote from gate 76 is connected to ground via capacitor 81, and is also connected to the input of gate 77. In a similar fashion, it can be seen that resistor 79, gate 77, and capacitor 81 form a second stage in a time delay, since some time is required to charge capacitor 81 enough so that the input to gate 77 is logically high, bringing its output logically high. The output of gate 77 is connected to the reset input R of ring counter 83.

It was previously noted that the output of OR-gate 85 was connected to an input of OR-gate 96. The other two inputs to OR-gate 96 are connected, respectively, to operational amplifiers 73,75. The output of OR-gate 96 is connected, inter alia, to another input to OR-gate 85. It can thus be seen that when either one of the outputs of operational amplifiers 73,75 go logically high, that the output of OR-gate 96 will also go logically high. This, in turn, will bring the output of OR-gate 85 logically high, and will cause a pulse to appear first at the output of gate 76, and later at reset input R of ring counter 83, resetting the counter.

Transistor 73' is connected to shunt the inverting and non-inverting inputs of operational amplifier 66 through its collector-emitter circuit. Likewise, transistor 93 shunts the inverting and non-inverting inputs of operational amplifier 86 through its collector-emitter circuit. Transistor 73' can be turned on by current flowing through its base via resistor 82, while transistor 93 can be similarly turned on by current flowing through its base via resistor 94. Transistor 73',93 are identical, as are resistors 82,94.

It has been previously noted that resistors 82,94 are connected to the output of gate 76, as is resistor 79. Thus, it can be seen that whenever either or both of operational amplifiers 73,75 goes logically high, that either or both of transistors 73',93 will be turned on and the inputs of either or both of operational amplifiers 66,86 correspondingly shunted. Additionally, such shunting will take place prior to resetting of ring counter 83.

Hence, the circuitry in FIG. 2 which has just been described performs two separate sets of functions simultaneously. Firstly, first and second digital input signals are developed at the outputs of operational amplifiers 69,74, which first and second digital input signals can be used later on to determine whether or not the camera is properly focused, and if not, in which direction a motor should rotate in order to focus the camera properly.

In addition, it will be clear that whenever such first and second digital input signals have been generated, (excepting in a special case discussed later), one or the other of the outputs of operational amplifiers 73,75 will also go positive. This will have the effect of causing first and second integrators formed by operational amplifiers 66,86 to be shunted, causing their outputs to rise and cutting off the time-integrations performed therein. Thus, it will become apparent that a plurality of successive logically low and logically high states can be reflected at the outputs of operational amplifiers 69,74 to enable the first and second digital input signals to be repeatedly generated. After the generation of a logically low or logically high state at either one of operational amplifiers 69,74 (or both), a pair of first and second digital input signals are available for detection of congruence and non-congruence, and the circuit can be reset so as to enable another pair of such signals to be quickly developed.

The output of operational amplifier 69 is connected to the D input to flip-flop 84, which like flip-flop 45 is a D-type flip-flop. In a similar fashion, the output of operational amplifier 74 is connected to the D input to flip-flop 97, which is also a D-type flip-flop. Thus, the first and second digital input signals can be registered in flip-flops 84,97 respectively, whenever clock pulses are generated and introduced to the clock inputs C of flip-flops 84,97.

Clock inputs C of flip-flops 84,97 are connected to the output of OR-gate 96. Thus, whenever one of the outputs of operational amplifiers 73,75 goes logically high, a secondary clock pulse is generated which first causes the first and second digital impulses to be registered in flip-flops 84,97 respectively, and subsequently causes the first and second integrators to be shunted. (The term "secondary" is here used because pulse generator 42 is a primary clock—it can be seen that ring counter 83 is clocked only in response to clock pulses generated in pulse generator 42 and is therefore a secondary clock.)

It may thus be seen that the contents of flip-flops 84,97 can be used in order to determine whether or not the camera needs to be refocused, and in the event that such refocusing is necessary, the contents of flip-flops 84,97 can be used to determine the direction in which such refocusing should take place. In order to accomplish such refocusing, a DC motor 108 is driven by driver amplifiers 107,109. Driver amplifiers 107,109 are placed across battery 1 when switch 2 is closed. Thus, the full battery voltage without any voltage loss in diode 5 and resistor 6 is available to power amplifiers 107,109. When amplifier 107 is turned on, motor 108 is driven in one direction, while amplifier 109 is turned on, motor 108 is driven in the opposite direction. By keeping both amplifiers 107,109 off, the motor can be de-energized.

Thus, it is necessary to connect flip-flops 84,97 to amplifiers 107,109 in order to cause motor 108 to be driven. Such connection begins with AND-gates 105,106. AND-gate 105 turns amplifier 107 on when the output of AND-gate 105 is logically high, and turns amplifier 107 off when the output of AND-gate 105 is logically low. AND-gate 106 works in the same fashion—amplifier 109 is turned on and off depending on the logical state of the output of AND-gate 106.

Each of AND-gates 105, 106 has four separate inputs, which must all be logically high in order to turn the appropriate AND-gate on.

Each of AND-gates 105,106 has a first input, a second input, a third input, and a fourth input. These inputs are ordered from topmost to bottommost, as they are shown in FIG. 2. The first inputs of AND-gate 105 and AND-gate 106 are connected together, and are further connected together to the $\overline{Q}$ output of flip-flop 104. The D input of flip-flop 104 is connected to the hot side of the power supply and is therefore kept logically high. Thus, the $\overline{Q}$ output will be maintained at a logically high state, and will only assume a logically low state when a pulse is directed to input C of flip-flop 104. Hence, the first inputs of AND-gates 105,106 will normally be logically high. Likewise, the third inputs of AND-gates 105,106 are connected together to the $\overline{Q}$ output of flip-flop 115. As in the case of flip-flop 104, the D input of flip-flop 115 is connected to the hot side of the power supply, and is therefore maintained at a logically high state. Hence, output $\overline{Q}$ of flip-flop 115 will only be logically low when a pulse is introduced to the clock input C of flip-flop 115. Therefore, the third inputs of AND-gates 105,106 are normally maintained in a logically high state.

After the first and second digital input signals have been clocked into flip-flops 84,97, four possible cases can result. It will be recalled that when both the first digital input signal and the second digital input signal are congruent (i.e., are both logically high or logically low), the camera will be properly focused. (The case in which congruency takes place because of signal weakness will be discussed later on.) In the event that the first and second digital input signals are non-congruent, i.e., in the event that they are of logically opposite senses, it is necessary to drive motor 108 in such a fashion as to bring the first and second digital input signals to congruence with each other. To that end, non-congruence and the sense of such non-congruence must be determined.

One input of EXCLUSIVE-NOR-gate 111 is connected to output Q of flip-flop 84, while the other input is connected to output Q of flip-flop 97. EXCLUSIVE-NOR-gate 111 will have a logically low output when, and only when, the first and second digital input signals as clocked into flip-flops 84,97 are non-congruent. Thus, whenever such non-congruence occurs, the outputs of EXCLUSIVE-NOR-gate 111 will be logically low.

Flip-flop 113 is clocked at clock input C by the output of OR-gate 96, and has its D input connected to the hot side of the power supply. Thus, when the first and second digital input signals are clocked into flip-flops 84,97, the $\overline{Q}$ output of flip-flop 113 will be brought logically high. Since the $\overline{Q}$ output of flip-flop 113 is connected to one input of NOR-gate 112 and the output of EXCLUSIVE-NOR-gate 111 is connected to the other input of NOR-gate 112, the output of NOR-gate 112 will be brought logically high. Thus, since the second inputs of AND-gates 105,106 are connected together to the output of NOR-gate 112, the second inputs of AND-gates 105,106 are brought logically high.

If the first digital input signal clocked into flip-flop 84 is logically high and the second digital input signal clocked into flip-flop 97 is logically low, AND-gate 106 will have a logically low output, since the fourth input to AND-gate 106 is connected to output Q of flip-flop 97, which is logically low. On the other hand, OR-gate 110 has an input which is connected to the output Q of flip-flop 84, and therefore the output of OR-gate 110 will be brought logically high. Therefore, all the inputs to AND-gate 105 are simultaneously logically high and amplifier 107 can thus be driven to rotate motor 108 in such a direction as to achieve congruence between the first and second digital input signals.

On the other hand, if the first digital input signal which is clocked into flip-flop 84 is logically low while the second digital input signal clocked into flip-flop 97 is logically high, the second inputs to AND-gates 105,106 will remain logically high since non-congruence between the first and second digital input signals will still exist. However, both inputs to OR-gate 110 will be logically low, which will bring the fourth input to AND-gate 105 logically low and will disable amplifier 107. Moreover, since the Q output of flip-flop 97 is now logically high, the third input to AND-gate 106 will be brought logically high, and AND-gate 106 will have a logically high output and will turn amplifier 109 on, driving motor 108 in the reverse direction in order to achieve subsequent congruence between the first and second digital input signals. Thus, motor 108 will be rotated according to the sense of the non-congruence between the first and the second digital input signals.

In the event that the first and second digital input signals are congruent, the output of EXCLUSIVE-NOR-gate 111 will be brought logically high so that the output of NOR-gate 112 will be brought logically low, disabling AND-gates 105,106. Thus, a discriminator circuit is formed which enables congruence and non-congruence between the first and second digital input signals to be established, and this discriminator circuit drives a servo drive that allows motor 108 to be appropriately rotated.

The input of delay stage 100 is connected to the Q output of flip-flop 104, and the output of delay stage 100 is connected to an input of EXCLUSIVE-OR-gate 101. The other input of EXCLUSIVE-OR-gate 101 is connected to the Q output of flip-flop 97. The delay has a time constant which is small as compared to the duration of secondary clock pulses which appear at output Qm of ring counter 83. It can thus be seen that whenever congruence exists between the first and second digital input signals which are clocked into flip-flops 84,97, the output of EXCLUSIVE-NOR-gate 101 will be brought logically high for a period equal to the time constant of the time delay 100.

The output of EXCLUSIVE-NOR-gate 101 is connected to a trigger circuit 102 which triggers on the positive-going flank of any pulse existing at the output of EXCLUSIVE-NOR-gate 101. Trigger circuit 102 feeds the clock input C of counter 103, which is so designed that it triggers on the negative-going flank of pulses generated by trigger circuit 102. The width of the pulses from trigger circuit 102 can be adjusted.

The counter 103 has a first output Q1 and an output Q3. Counter 103 can be viewed as a shift register, in which every fourth pulse causes output Q3 to go logically high. Output Q3 of counter 103 is connected to the clock input C of flip-flop 104. It can thus be seen that a pulse is generated at output Q1 of counter 103 each time that the first and second digital input signals change their states so that they change from non-congruence in one sense to non-congruence in another sense, or when they change their states from non-congruence to congruence. Thus, pulses appear at output Q1 of counter 103 each time that motor 108 is rotated so as to properly focus the camera, and each time that motor 108 overshoots a proper state of focus. Thus, counter 103 produces transition signals which can be processed in order to disable motor 108, as will be explained immediately below.

After four such transition signals have been generated, output Q3 of counter 103 will be brought logically high so that clock input C of flip-flop 104 will be pulsed. This, in turn, will cause output $\overline{Q}$ of flip-flop 104 to be brought logically low. This, in turn, will cause the first inputs of AND-gates 105,106 to be brought logically low, causing AND-gates 105,106 to have logically low outputs and to turn amplifiers 107,109 off. Thus, after four such transition signals have been generated, motor 108 is disabled and is prevented from further rotation until trigger circuit 102 generates another pulse. In this fashion, continuous oscillation of motor 108 about a point of proper focus can be prevented, and it is also possible to cause motor 108 to approach a state of proper focus asymptotically in the event that inertia causes motor 108 and other mechanical elements to continue rotation even after current through motor 108 has been cut off.

Upon start-up of the control circuit, i.e., upon closure of switch 2, it is likely that switching transients and the like will cause outputs Q of flip-flops 84,97 to go logically high regardless of the actual states of photodiodes 9,10. In the event that this were to take place, motor 108 would be permanently de-energized, since AND-gates 105,106 would have logically low outputs. In order to prevent this situation from continuing, AND-gate 114 and flip-flop 115 are provided. One input of AND-gate 114 is connected to output Q1 of counter 103, while the other input to AND-gate 114 is connected to the output of OR-gate 85. After a pulse appears at output Qm of ring counter 83, (which, in turn, will take place after the proper number of pulses have been generated by pulse generator 42) AND-gate 114 will develop a logically high signal at its output, and will cause output $\overline{Q}$ of flip-flop 115 to go logically low. This will continue to keep AND-gates 105,106 shut off and will cause motor 108 to be de-energized. However, as soon as the time constant of the first stage of the time delay network associated with ring counter 83 (namely, the time constant of resistor 78, capacitor 80, and gate 76) is passed, both the first and second integrators will be shunted by transistors 73',93 and normal operation of the rest of the circuitry can begin. After such shunting, the first and second integrators can operate normally and clock first and second digital input signals into flip-flops 84,97, so that the contents of these flip-flops actually reflects the statuses of photodiodes 9,10, and after output Qm of ring counter 83 assumes a logically low state the output of AND-gate 114 will go logically low, permitting the circuit to continue in normal operation.

A situation may arise in which the subject is so far away from the camera objective that insufficient energy is reflected back from the subject to properly illuminate photodiodes 9,10, causing them to produce such weak signals that the first and second integrators never cause the outputs of operational amplifiers 69,74 to go positive. In this situation, the first and second digital input signals which are clocked into flip-flops 84,97 would both be congruent with each other—outputs Q of flip-flops 84,97 would both be logically low. Normally, this would be interpreted as a state of proper focus, and motor 108 would not be energized at all. EXCLUSIVE-NOR-gate 111, NOR-gate 112, flip-flop 113, and OR-gate 85 cooperate to rectify this situation. Inasmuch as insufficiently strong signals will be interpreted as congruent, logically low first and second digital input signals in flip-flops 84,97, the output of EXCLUSIVE-NOR-gate 111 will be brought logically high. However, when a secondary clock pulse generated at the output of OR-gate 85 is produced, the output of OR-gate 96 will be brought logically high and output $\overline{Q}$ of flip-flop 113 will be brought logically low. Therefore, the output of NOR-gate 112 will remain logically high, causing the second inputs of AND-gates 105,106 to remain logically high, notwithstanding the congruence (or seeming congruence) of the first and the second digital input signals. Additionally, the $\overline{Q}$ output of flip-flop 97 will be brought logically high, so that the output of OR-gate 110 will also be brought logically high. Thus, in this situation, AND-gate 105 will be momentarily energized, causing motor 108 to be driven. Inasmuch as a weak-signal state will take place when a subject is far away, it can thus be seen that AND-gate 105 and amplifier 107 are used in order to cause motor 108 to rotate a camera objective so that the objective focuses closer to infinity. AND-gate 106 and amplifier 109 therefore cause motor 108 to focus the camera objective away from infinity.

After such energization, the first and second integrators are shunted once again, and it can be seen that a transition signal will once again be generated. Thus, after four successive secondary clock pulses have been generated at the output of OR-gate 85, motor 108 will once again be deenergized.

Figure 3:
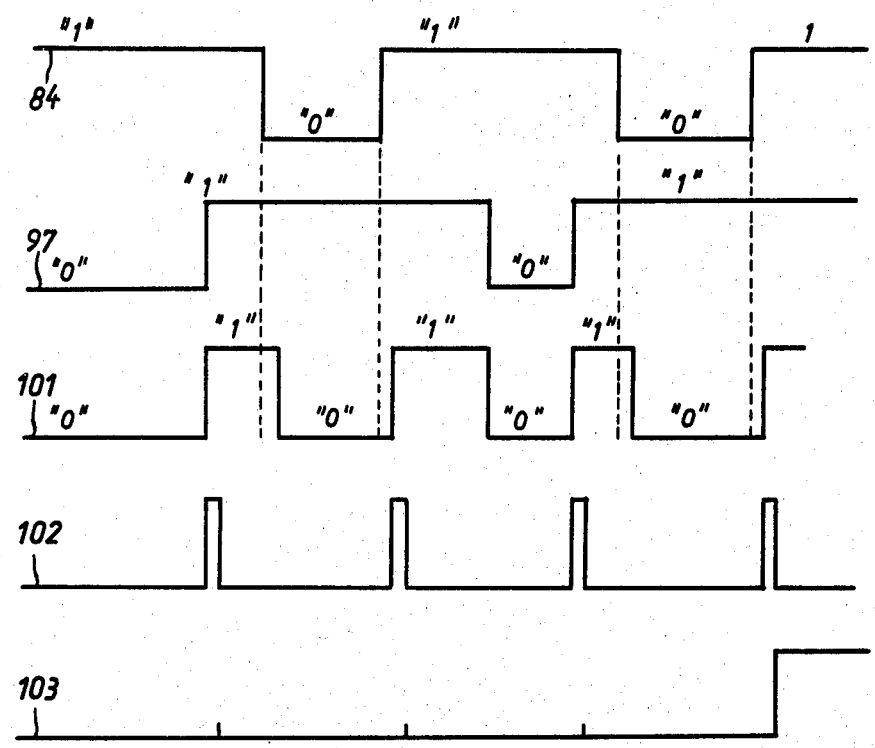
FIG. 3 shows graphs which demonstrate how the invention operates to focus a camera objective when inertia causes overshoot to take place.

Referring now to FIG. 3, the consequences of motor and objective inertia can be seen to be demonstrated. Initially, the first digital input signal clocked into flip-flop 84 is logically high, while the second digital input signal clocked into flip-flop 97 is logically low. This causes the output of gate 105 to go logically high and motor 108 is driven so as to establish equilibrium between the two digital input signals. After the two digital input signals are brought into congruence with each other, the trigger circuit 102 generates a pulse and the first and second integrators are shunted. However, because of inertia, motor 108 continues to rotate even though it has been de-energized when the output of AND-gate 105 has been brought logically low. Some time later, overshoot of motor 108 causes the first digital input signal clocked into flip-flop 84 to become logically low, causing a non-congruence between the first and second digital input signals to exist. At this point, the output of AND-gate 105 remains logically low, but the output of AND-gate 106 is brought logically high, to cause motor 108 to be rotated in the opposite direction. After congruence has once again been achieved, trigger circuit 102 generates another pulse, and motor 108 is de-energized once again. Again, overshoot of motor 108 takes place, causing the second digital input signal to go logically low and thus causing non-congruence to exist. AND-gate 105 is thus used once again to drive motor 108, until congruence is reachieved. At this point, the motor is de-energized and trigger circuit 102 generates a third pulse. After still another overshoot, the output of AND-gate 106 is once again brought logically high, and motor 108 begins to rotate. As soon as trigger circuit 102 generates the negative flank of a pulse produced at its outlet, output Q3 of counter 103 goes logically high and both AND-gates 105,106 cause amplifiers 107,109 to be turned off, keeping motor 108 de-energized until trigger circuit 102 generates a subsequent pulse. Inasmuch as motor 108 is repeatedly energized in opposite directions and moves out of the proper state of focus only because of inertia, proper positioning of the motor 108 is at least approached asymptotically.

Figure 4:
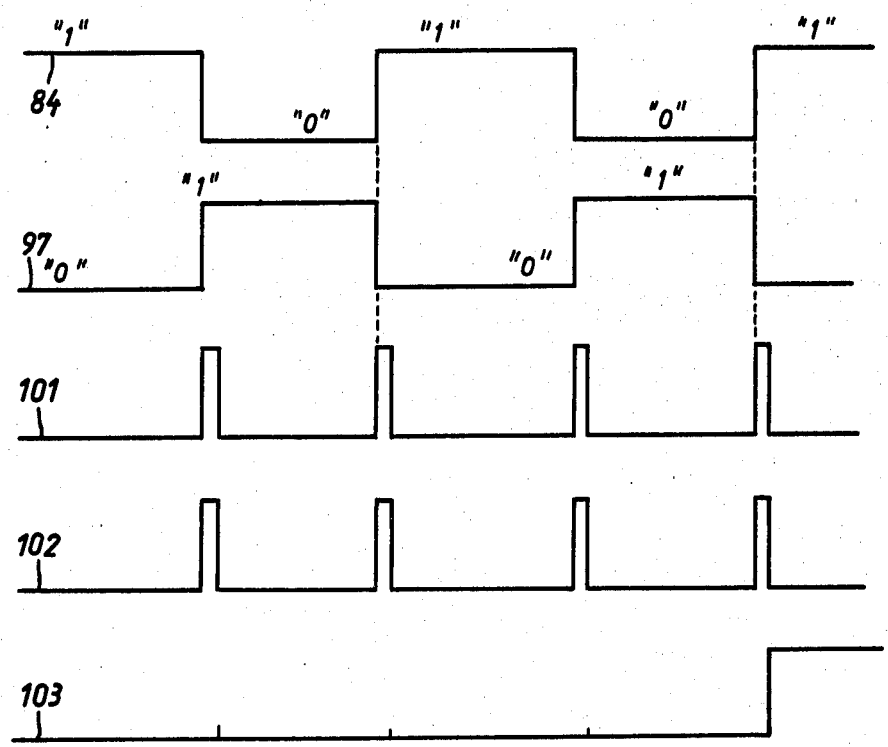
FIG. 4 shows graphs which demonstrate how the invention prevents continuous oscillation of the motor from continuing.

FIG. 4 shows a situation in which motor oscillation about a point of proper focus takes place, in which motor 108 is never de-energized while it is properly positioned. As is evident from FIG. 4, after four such oscillations, motor 108 is once again de-energized, because the logically high state of output Q3 of counter 103 causes the output $\overline{Q}$ of flip-flop 104 to go logically low and to override the commands of the remaining circuitry to cause motor 108 to re-rotate once again. This override, of course, takes place because the first inputs of AND-gates 105,106 are brought logically low.

Figure 5:
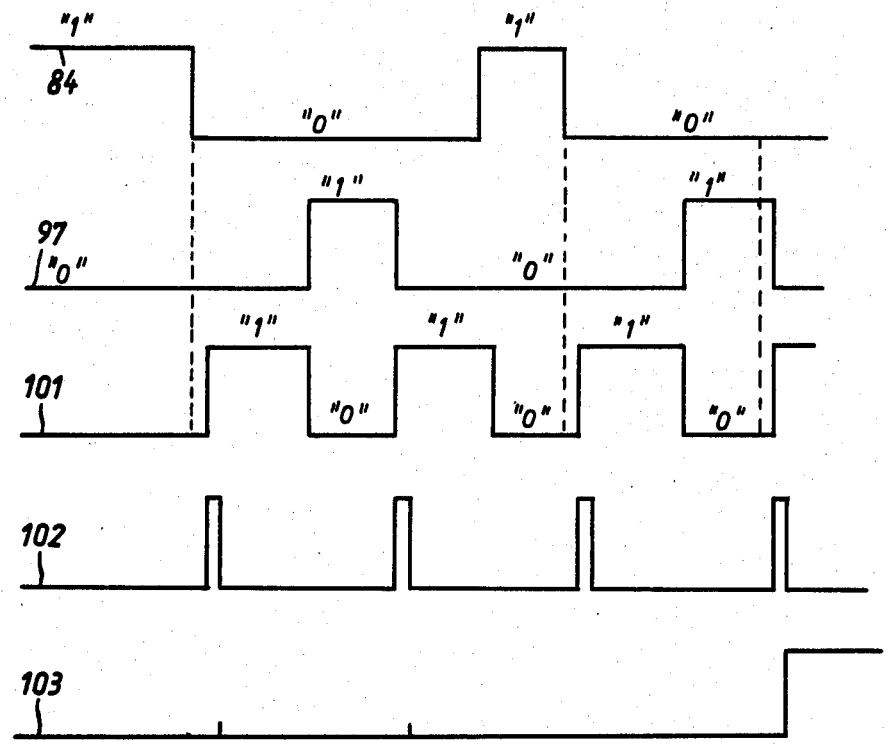
FIG. 5 shows graphs demonstrating how the invention operates when the receivers do not receive radiation which is sufficiently strong so as to enable congruence and non-congruence to be determined.

Finally, FIG. 5 illustrates in graphic form the explanation of what happens when energy received at photodiodes 9,10 is sufficiently weak that congruence and non-congruence between the first and the second digital input signals cannot accurately be determined. As before, the circuit continues to operate until such time as four pulses have been produced by trigger circuit 102, at which point AND-gates 105,106 have their outputs brought logically low, disabling motor 108 until such time as a subsequent pulse is issued by trigger circuit 102.

It will be understood that each of the elements described above, or two or more together, may also find a useful application in other types of constructions differing from the types described above.

While the invention has been illustrated and described as embodied in a digital control system for automatic-focus cameras, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a digital automatic focusing system for use in cameras and the like which utilizes a clocked radiation transmitter emitting pulses of radiation with a fixed frequency, amplitude and pulse duration, like first and second radiation receivers receiving the pulses and generating first and second received signals corresponding thereto, and a signal processing network processing the first and second received signals so as to make them distinguishable from background radiation and electrical noise, an improvement for converting the first and second received signals to digital signals comprising:

a first integrator connected to the signal processing network and responding to the first received signal after it has been processed therein and producing a first analog signal which is a time-integrated transformation of the first received signal;

a second integration connected to the signal processing network and responding to the second received signal after it has been processed therein and producing a second analog signal which is a time-integrated transformation of the first received signal;

a first comparator stage connected to the first integrator and having a first threshold value which is large as compared to pulse amplitude, the first comparator stage operating in a manner that a first digital input signal is produced which is characteristic of the first analog signal, with the first digital input signal being logically high when the first analog signal exceeds the first threshold value and being logically low otherwise;

a second comparator stage connected to the second integrator and having a second threshold value which is large as compared to pulse amplitude, the second comparator stage operating in a manner that a second digital input signal is produced which is characteristic of the second analog signal, with the second digital input signal being logically high when the second analog signal exceeds the second threshold value and being logically low otherwise;

a first means cooperating with the first integrator so as to define an integration period over which time-integration takes place, which integration period is long as compared with pulse duration of the pulse emitted by the radiation transmitter;

a second means cooperating with the second integration so as to define a like integration period; and a secondary clock which is clocked in a fixed place and frequency relationship with respect to the transmitter, the secondary clock cooperating with the first means and the second means so as to clock the first digital input signal and the second digital input signal.

2. The improvement defined by claim 1, further including a first clocked flip-flop into which the first digital input signal may be clocked by the secondary clock and a second clocked flip-flop into which the second digital input signal may be clocked by the secondary clock.

3. The improvement defined by claim 1, wherein each of the first and second comparator stages includes a reset pulse generator operating in a manner that after a corresponding high digital input signal is generated by a comparator stage, a reset pulse is generated and routed to the first means and the second means for starting a subsequent time-integration.

4. The improvement defined by claims 1, 2 or 3, wherein the secondary clock is a self-resetting ring counter driven by clock pulses which are used to clock the transmitter.

5. The improvement defined by claim 4, wherein the ring counter operates in a manner that the first and second means are always operated to start a subsequent time-integration prior to a resetting of the ring counter.

6. The improvement defined by claim 5, wherein the ring counter includes:

a counter chip having a clocked input, an output and a reset input;

an OR-gate having a first input connected to the output of the counter chip, a second input connected to both of the reset pulse generators, and an output;

a first time delay stage having an input connected to the output of the OR-gate and an output connected to the first means and the second means; and a second time-delay stage having an input connected to the output of the first time-delay stage and an output connected to the reset input of the counter chip.

7. The improvement defined by claim 3, wherein the comparator stages each include a first operational amplifier and a second operational amplifier in parallel therewith, said operational amplifiers being so biased that for a given digital input signal, the first operational amplifier will produce an output prior to a production of an output by the second operational amplifier.

* * * * *

UNITED STATES PATENT AND TRADEMARK OFFICE
CERTIFICATE OF CORRECTION

PATENT NO. : 4,344,024
DATED : August 10, 1982
INVENTOR(S) : Istvan Cocron

It is certified that error appears in the above—identified patent and that said Letters Patent is hereby corrected as shown below:

On the title page:
In the heading [30], the filing date of the German application should read:

July 12, 1979

Signed and Sealed this

Tenth Day of May 1983

[SEAL]

Attest:

GERALD J. MOSSINGHOFF

Attesting Officer

Commissioner of Patents and Trademarks